Aug. 3, 1965  T. F. O'BRIEN  3,198,206
PIERCING VALVE
Filed Aug. 1, 1961

INVENTOR
THOMAS F. O'BRIEN
BY
ATTORNEY 3,198,206
PIERCING VALVE
Thomas F. O'Brien, 14 Laurel St., Rockville, Conn.
Filed Aug. 1, 1961, Ser. No. 128,508
1 Claim. (Cl. 137—315)

This invention relates to valve constructions, more particularly to a piercing valve for use with charging equipment such as for refrigeration systems.

In the business of repairing refrigeration equipment, it frequently is necessary to recharge the hermetically sealed cooling unit. This unit ordinarily is not provided with a valve for this purpose. In order to introduce refrigerant into the cooling unit line the tubing must be cut and a valve installed or mounted on the line. This valve, or at least a part thereof, must be left in the line after the recharging operation has been completed in order to seal the line. It, therefore, becomes important that the cost of the valve portion which becomes a part of the refrigeration line be kept as cheap as possible.

Of even more importance is the fact that the valve should present no opportunity for the introduction of metal chips or foreign matter between the sealing elements or into the closed refrigeration system which might prevent proper sealing and loss of the refrigerant or which might measurably increase wear on the sealed and lubricated bearing surfaces within the refrigeration system, the prevention of which would require the incorporation of a cumbersome straining device. This introduction of chips can happen where the charging gas must flow over a threaded surface or where a threaded surface is located above the sealing elements since machining chips will be carried or will drop between sealing surfaces and prevent contact therebetween or will be carried into the refrigeration system to interfere with proper operation of the system.

An object of my invention, therefore, is to provide an improved piercing valve which is dependably effective, giving long and positive protection to the refrigeration or other equipment with which it is used.

Another object of my invention is to provide an improved piercing valve in which there is no possibility of metal chips from threaded portions of the valve being flushed or introduced between sealing surfaces or into a closed refrigeration system.

Another object of my invention is to provide an improved piercing valve in which the piercing element is forced into the refrigeration line or other equipment by screwing downward a separate threaded valve element whose threaded surface is remotely located from the piercing element or any passage through which charging gas will flow.

Another object of my invention is to provide an improved piercing valve which is readily useable with various sizes of refrigeration lines and with each of which there is line contact of the refrigeration line with the body of the valve.

Still another object of my invention is to provide an improved piercing valve the majority of the elements of which can be made cheaply by die casting.

Other objects and advantages will be apparent from the following specification and claim, and from the accompanying drawing which illustrates an embodiment of the invention.

Figure 1:
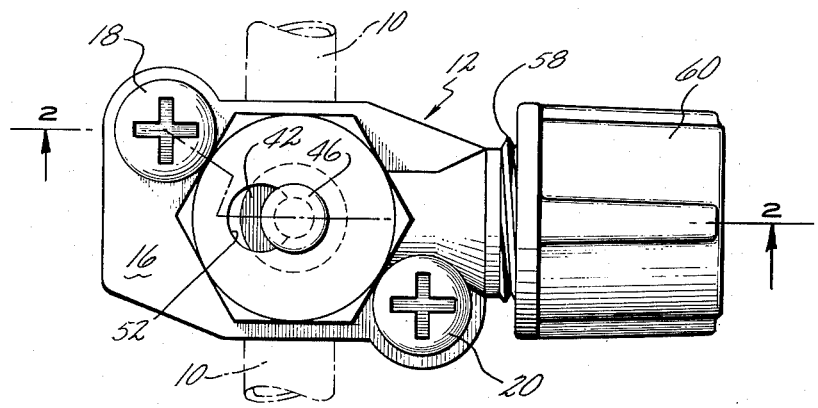
FIG. 1 shows a plan view of my piercing valve.

Referring to the drawing in detail, 10 indicates in FIG. 1 a refrigeration line to which piercing valve 12 has been applied for the purpose of charging the line.

Figure 2:
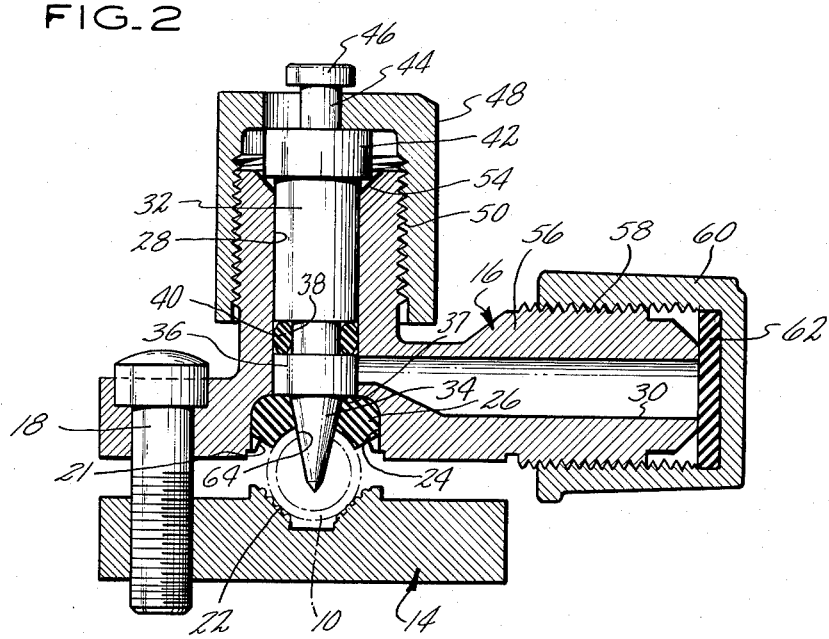
FIG. 2 is a section view through my piercing valve along line 2—2 in FIG. 1.

As can be seen in FIG. 2, the piercing valve includes clamping member 14 and body 16 applied directly to the lower and upper surfaces, respectively, of line 10 and held together by screws 18 and 20 (FIG. 1). Clamping member 14 includes grooved, V-shaped notch 22 cradling and in contact with the lower surface of the refrigeration line. Body 16 includes circular-shaped groove 21 which contacts the upper surface of the refrigeration line along a longitudinal line, and counterbore 24 which contains flexible grommet 26 in contact with an area on the upper surface of the refrigeration line. The grommet seals the refrigeration line in the area where the line is pierced for the introduction of refrigerant, the seating of the refrigeration line in groove 21 determining the squeeze imparted to the grommet.

Body 16 contains bore 28, which is coaxial with counterbore 24, and passage 30 which intersects bore 28 immediately above counterbore 24. The bore has mounted therein piercer 32 which includes piercing and sealing needle 34, land 36 the lower annular face 37 of which cooperates with grommet 26 to control gaseous communication between passage 30 and line 10, annular groove 38 containing O-ring gasket 40 sealing the bore, shoulder 42, groove 44, and head 46.

Thrust cap 48 engages groove 44 of piercer 32 between shoulder 42 and head 46 and is connected to body 16 by threads 50. As the thrust cap is screwed downward on body 16, the upper surface of shoulder 42 is engaged to move the piercer downward; and as the thrust cap is screwed upward, the lower surface of head 46 is engaged to move the piercer upward. Locking slot 52 is provided in the end wall of the thrust cap for mounting the piercer within the thrust cap. The larger diameter of the locking slot is slightly larger than the diameter of head 46 on the piercer so that the head can be put through the slot. The piercer is then moved toward the axis of the thrust cap so that groove 44 on the piercer fits within the smaller diameter of the locking slot. When the piercer and thrust cap are installed on body 16, bore 28, piercer 32 and the smaller diameter portion of locking slot 52 are coaxial. Bevelled edge 54 on the upper end of bore 28 cooperates with shoulder 42 to control downward travel of the piercer.

Projection 56 extends from body 16 and defines passage 30. The outer surface of the projection is threaded as at 58 to provide for attachment thereto of the hose from a charging tank. Cap 60 normally covers the end of projection 56 and the end of passage 30 is sealed by washer 62 within the cap.

When it is desired to charge a hermetically sealed refrigeration unit, clamping member 14 and body 16 are located directly on refrigeration line 10 at the place where the piercing conveniently can be done and clamped together by screws 18 and 20. The clamping action compresses flexible grommet 26 against the line. Piercer 32, on which O-ring gasket 40 had been placed, then is placed in bore 28 and thrust cap 48 is attached to body 16 by threads 50. The piercer previously had been mounted in the thrust cap by inserting head 46 on the piercer through the enlarged diameter portion of locking slot 52 and then seating groove 44 on the piercer in the smaller diameter portion of the locking slot.

As thrust cap 48 is screwed downward, piercing and sealing needle 34 contacts line 10 and punches and seals hole 64 therein. Downward travel of the piercer and cap terminates when the lower edge of shoulder 42 on the piercer contacts bevelled edge 54, face 37 on land 36 having engaged and compressed grommet 26 to provide a seal at this location.

Cap 60 and sealing washer 62 then are removed and a charging hose is attached to thread 58 on projection 56.

Thrust cap 48 then is backed-off to raise piercer 32, lifting face 37 from sealing contact with grommet 26 and moving piercing and sealing needle 34 out of hole 64. The thrust cap is backed-off sufficiently far to provide ready communication between bore 28 and passage 30. The charging tank is then opened to admit refrigerant to line 10.

When the pressure in line 10 has been charged to the required value, thrust cap 48 is screwed down to lower piercer 32 and locate piercing needle 34 in hole 64 and seal face 37 against grommet 26. As can be seen in the construction, there are no threaded surfaces over which the charging gas passes, or threaded surfaces above bore 28, to provide the source of a metal chip which might become dislodged and then wedged between face 37 and grommet 26 or between piercing needle 34 and hole 64 to prevent positive sealing by the face and the piercing needle. A wedged chip at either of these locations or a chip within the refrigeration line can seriously affect the refrigeration unit.

After the thrust cap has been turned down as far as it will go, the charging hose can be disconnected from projection 56, and cap 60 and washer 62 re-installed thereon. The washer and O-ring gasket 40 provide sealing protection in addition to that provided by piercing and sealing needle 34 and annular face 37.

It is to be understood that the invention is not limited to the specific embodiment herein illustrated and described, but may be used in other ways without departure from its spirit as defined by the following claim.

I claim:

A piercing valve for recharging a hermetically sealed unit, said valve including body means attachable to a line of said unit, sealing means between said body and said line, a bore extending through said body, an external threaded area on said body coaxial with said bore, passage means in said body intersecting said bore, piercing means positionable in said bore and having sealing means thereon for controlling communication between said line and said passage means, a thrust cap threadedly connected to the threaded area of said body and having locking slot means thereon, said slot means having portions of different diameter, and means integral with said piercing means including a groove and head means of unequal diameter at opposite ends of said groove enabling assembly of said piercing means in said thrust cap locking slot means in one aligned position and precluding disassembly of said thrust cap and said piercing means in another aligned position in which other position said cap is laterally displaced with respect to the axis of said piercing means and said thrust cap may be threadedly mounted on said body.

References Cited by the Examiner

UNITED STATES PATENTS

| Re. 24,199 | 8/56 | McDonald | 137—318 |
| 2,372,454 | 3/45 | Smith | 222—5 |
| 2,827,913 | 3/58 | Wagner | 137—318 |
| 3,038,490 | 6/62 | Yocum | 137—318 |
| 3,115,889 | 12/63 | Franck | 137—318 |

FOREIGN PATENTS

| 212,769 | 2/58 | Australia. |
| 505,046 | 5/39 | Great Britain. |

ISADOR WEIL, *Primary Examiner.*
ROBERT A. O'LEARY, *Examiner.*